(12) United States Patent
Keane (10) Patent No.: US 10,310,714 B2
(45) Date of Patent: Jun. 4, 2019

(54) METHOD, SYSTEM AND APPARATUS FOR DISPLAYING CONTENT

(71) Applicant: BigTinCan Holdings Pty Ltd, Sydney (AU)

(72) Inventor: David Malcolm Keane, Killara (AU)

(73) Assignee: BIGTINCAN HOLDINGS PTY LTD, Sydney (AU)

( * ) Notice: Subject to any disclaimer, the term of this patent is extended or adjusted under 35 U.S.C. 154(b) by 332 days.

(21) Appl. No.: 14/899,940

(22) PCT Filed: Jun. 17, 2014

(86) PCT No.: PCT/AU2014/000624
§ 371 (c)(1),
(2) Date: Dec. 18, 2015

(87) PCT Pub. No.: WO2014/201494
PCT Pub. Date: Dec. 24, 2014

(65) Prior Publication Data
US 2016/0147396 A1    May 26, 2016

(30) Foreign Application Priority Data
Jun. 19, 2013  (AU) ................................ 2013902221

(51) Int. Cl.
*G06F 3/0483* (2013.01)
*G06F 3/0481* (2013.01)
(Continued)

(52) U.S. Cl.
CPC .......... *G06F 3/0483* (2013.01); *G06F 3/0481* (2013.01); *G06F 3/0482* (2013.01);
(Continued)

(58) Field of Classification Search
CPC ..... G06F 3/0483; G06F 3/0482; G06F 3/0484
See application file for complete search history.

(56) References Cited

U.S. PATENT DOCUMENTS 6,259,436 B1 * 7/2001 Moon ................... G06F 3/0488
345/173
6,489,975 B1  12/2002 Patil et al.
(Continued)

OTHER PUBLICATIONS

PCT; App. No. PCT/AU2014/000624; International Search Report and Written Opinion dated Jul. 31, 2014.
(Continued)

*Primary Examiner* — David E Choi
(74) *Attorney, Agent, or Firm* — Fitch, Even, Tabin & Flannery LLP (57) ABSTRACT

A method (300) of manipulating on a mobile device (600), using a software application (133) configured to emulate manipulation operations of different associated software applications, content items stored in slow access memory (125) on the mobile device, the method comprising (a) storing a selected plurality of items in fast access memory (109); (b) designating one of the stored items as the active item and displaying (310) the active item and an associated tab; (c) displaying tabs associated with other stored items; (d) applying (316) an emulated manipulation operation associated with the active item to the active item; and (e) in response to a selection (320) of a displayed tab associated with another item, (i) storing (322) the manipulated active item in the fast access memory, (ii) displaying the other item associated with the selected tab.

7 Claims, 7 Drawing Sheets

(51) Int. Cl.
*G06F 3/0488* (2013.01)
*G06F 3/0482* (2013.01)
*G06F 3/0484* (2013.01)
*G06F 12/0802* (2016.01)

(52) U.S. Cl.
CPC ........ *G06F 3/0488* (2013.01); *G06F 3/04842* (2013.01); *G06F 12/0802* (2013.01); *G06F 2212/1024* (2013.01)

(56) References Cited

U.S. PATENT DOCUMENTS

| | | | |
|---|---|---|---|
| 2008/0127348 A1 | 5/2008 | Largman et al. | |
| 2010/0150155 A1* | 6/2010 | Napierala | H04L 45/00 370/390 |
| 2010/0211872 A1 | 8/2010 | Rolston et al. | |
| 2012/0036470 A1* | 2/2012 | Homma | H04N 1/00244 715/777 |
| 2012/0162160 A1 | 6/2012 | Amano et al. | |
| 2013/0031484 A1* | 1/2013 | Kluttz | G06F 17/30126 715/748 |
| 2013/0080930 A1* | 3/2013 | Johansson | G06F 9/46 715/760 |
| 2015/0220151 A1* | 8/2015 | Violet | G06F 3/0483 715/777 |
| 2016/0147396 A1* | 5/2016 | Keane | G06F 3/0481 715/777 |

OTHER PUBLICATIONS

Willington, R.; "Ixonos Creates Multi-Window Solution for Android"; https://hothardware.com/news/ixonos-creates-multiwindow-solution-for-android; published Feb. 20, 2011; pp. 1-3.

The Onskreen/cornerstone project, available on github since Feb. 19, 2013; https://github.com/Onskreen/cornerstone (see source files in the archive).

Weiczorek A. et al.; "Multiwindow Support on Android" (from Embedded Linus Conference + Android Builders Summit, San Jose, CA, USA, May 1, 2014; https://events.linuxfoundation.org/sites/events/files/slides/Multiwindow%20Support%20on%20Android_0.pdf).

Kingsoft: 'User Manual', Online resource, <URL: http://web.archive.org/web/20130508214911/http://www.kingsoftstore.com/user-manual >, May 8, 2013 as per Wayback Machine.

Androxplorer: 'Take charge of your Android!', Online resource, <URL: http://web.archive.org/web/20120823091914/http://androxplorer.com/fea.php > Aug. 23, 2012 as per Wayback Machine.

PCT; App. No. PCT/AU2014/000624; International Preliminary Report on Patentability dated Dec. 19, 2015.

* cited by examiner

METHOD, SYSTEM AND APPARATUS FOR DISPLAYING CONTENT

TECHNICAL FIELD

The present invention relates to a system and method for allowing a user of a mobile computing device such as a mobile phone or smart phone to view and interact with content associated with different software applications without having to successively execute and exit those applications.

BACKGROUND

Users are turning to mobile devices to perform more of their day-to-day computing tasks. Such users find it difficult to perform substantial work, on the small screen that is typically associated with the mobile computing environment.

Currently, a user wishing to work on his mobile device by interacting 'simultaneously' with multiple content items associated with different software applications, needs to interact with a single content item at a time. This involves successively executing and exiting each distinct software application in turn in order to interact with the related content item. The term 'simultaneously' in this context means switching easily between the content items in question with a minimum of operations.

Thus, for example, a user wishing to copy information from a spread-sheet document and paste the information into a word processor file currently needs to (a) open the spread-sheet document, (b) copy the desired data to memory, (c) close the spread-sheet file, (d) open the word processor document, and (e) paste the information into that word processor document. This sequence of operations is cumbersome, time consuming, prone to error, and significantly degrades productivity, performance and usability. The term 'open' in the present context as applied to a document or content item means executing a software application and opening a content item (also referred to as a document) associated with that software application. The term 'close' in the present context means (possibly) storing an active content item associated with a software application, and exiting the software application.

Figure 2:
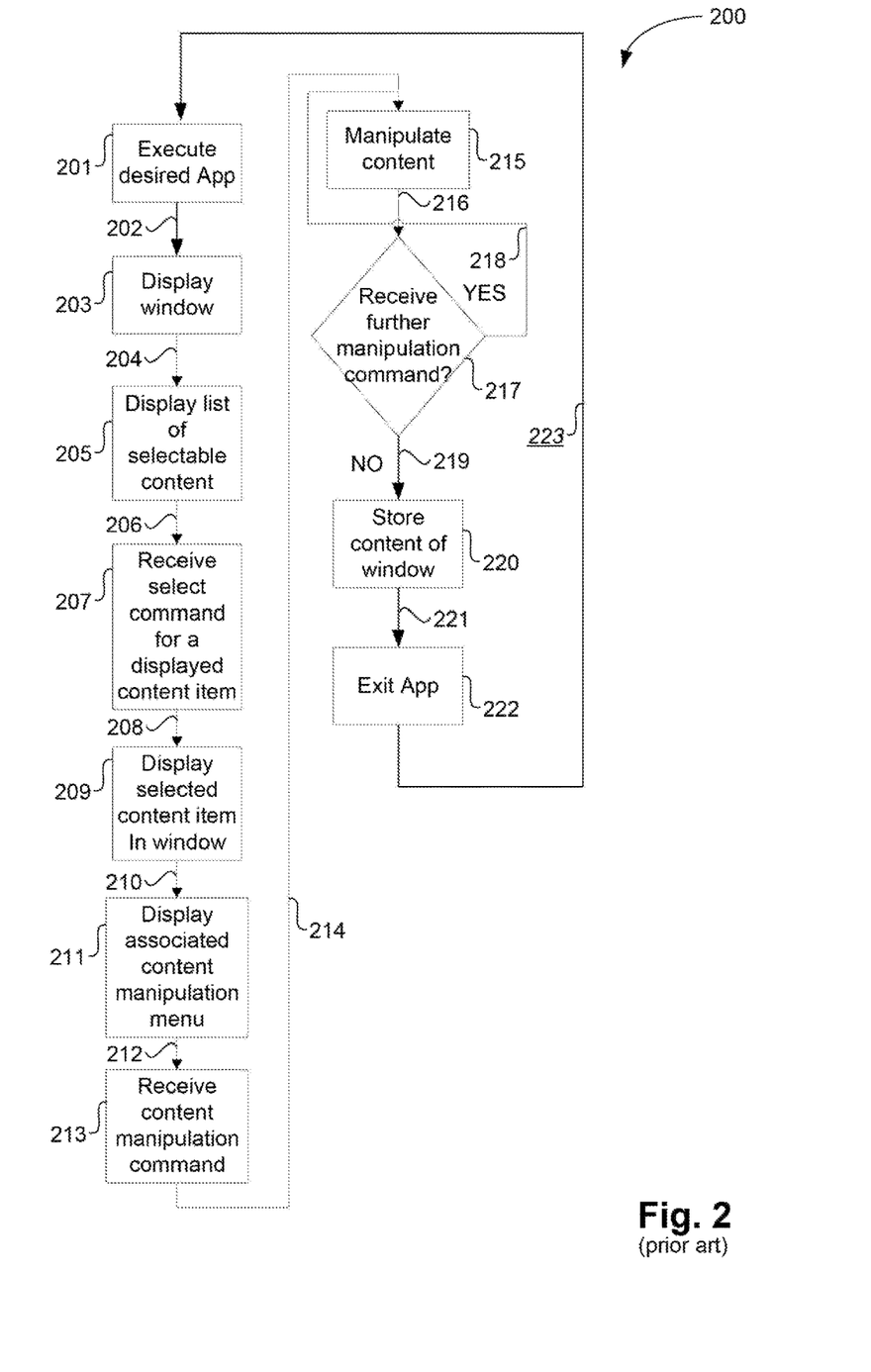
FIG. 2 shows a prior art method for manipulating a number of content items by successively executing and exiting associated software applications.

FIG. 2 shows an example of a prior art method for editing content items by successively executing and exiting associated software applications in the manner described above. The depicted process 200 commences with a step 201 in which a processor in the mobile device in question executes a desired software application (such as the spread-sheet program referred to above), and following an arrow 202, in a step 203 the processor displays a window in a display of the mobile device. In a step 205 following an arrow 204 the processor displays a list of selectable items (ie files or documents) for the spread-sheet program. In a step 207 following an arrow 206 the processor receives a select command from the user indicating a desired content item. In a step 209 following an arrow 208, the selected content item is displayed in the window referred to above.

In a step 211 following an arrow 210 the processor displays a menu of content manipulation options, including editing operations such as cut, paste and so on. The term manipulate is understood to include within it's scope both viewing and editing operations, unless otherwise stated. In a step 213 following an arrow 212 the processor receives a content manipulation command from the user, such as a command to select and copy a specified segment of text in the content item. In a step 215 following an arrow 214 the processor performs the manipulation command by applying the manipulation operation, copying the specified segment of text in the content item in the present example. In a test step 217 following an arrow 216 the processor determines if a further manipulation command has been received. If this is the case, the process follows a YES arrow 218 back to the step 215. If not, the process follows a NO arrow 219 to a step 220 in which the processor stores the content of the window. In a step 222 following an arrow 221 the processor exits the spread-sheet program and follows an arrow 223 back to the step 201 in which the user directs the processor to open the word processor software application.

Clearly the repetitive opening and closing of software applications and associated active documents (content items) which are being manipulated (ie viewed and edited) is cumbersome, time consuming, prone to data entry and control error, and degraded performance and productivity.

SUMMARY

It is an object of the present invention to substantially overcome, or at least ameliorate, one or more disadvantages of existing arrangements.

The system and methods described here allow the mobile device user to view and interact with multiple pieces of content 'on the same screen at the same time' (ie by easily switching between the multiple content items without needing to repetitively open and close the associated software applications). In one arrangement, the various content items are presented in a corresponding set of display regions referred to as 'tabs'. The user can quickly and easily move between tabs, thereby being able to manipulate a first content item associated with a first software application, and then quickly and easily move to another content item associated with the same or another software application, without needing to successively open and close the software applications.

This provides a rapid, convenient, low error prone mechanism, for manipulating content items, clearly improving productivity, and reducing user frustration and errors.

Disclosed are arrangements, referred to as Multi-Tab Manipulation (MTM) arrangements, which seek to address the above problems by providing a single software application capable of (a) emulating manipulation (ie viewing and editing) features for a plurality of different software applications (referred to as different associated software applications), and (b) enabling a user to apply relevant emulated manipulation operations to corresponding content items which are associated with corresponding tabs. In one MTM arrangement the content items loaded into the MTM software application (described hereinafter in more detail with reference to FIG. 4) are presented to the user in a Graphical User Interface (GUI) which displays tabs for some or all of the aforementioned loaded content items. Other GUI configurations can also be used.

According to a first aspect of the present invention, there is provided a computer implemented method of manipulating on a mobile device, using a single software application configured to emulate manipulation operations of a plurality of different associated software applications, content items stored in slow access memory on the mobile device, the method comprising the steps of: (a) storing a selected plurality of said items in fast access memory said items being designated as pseudo-active items; (b) designating one of the stored items as the active item and displaying the active item and an associated tab; (c) displaying tabs associated with the pseudo-active items without displaying the pseudo-active items; (d) applying an emulated manipulation operation associated with the active item to the displayed active item to form a manipulated active item; and (e) in response to a selection of a displayed tab associated with a pseudo-active item, (i) storing the manipulated active item in the fast access memory and removing the manipulated active item from display, (ii) displaying the pseudo-active item associated with the selected tab, and (iii) designating the displayed item as the active item and the stored manipulated item as a pseudo-active item.

According to another aspect of the present invention, there is provided an apparatus for implementing any one of the aforementioned methods.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

Some aspects of the prior art and at least one embodiment of the present invention will now be described with reference to the drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of arrangements which may form public knowledge through their respective publication and/or use. Such should not be interpreted as a representation by the present inventor(s) or the patent applicant that such documents or devices in any way form part of the common general knowledge in the art.

The MTM arrangements enable a user to move between different content items (eg content items associated with different software applications such as a word processor and spread-sheet, for example) without needing to repetitively execute and exit the associated word processor and spread-sheet applications. The MTM arrangements operate by removing "inactive" content items from slow access memory, and storing one content item designated as a displayed "active" content item and the other content items designated as "pseudo-active" content items in fast access storage. Inactive content items are thus stored in slow access memory, and pseudo-active and active content items are stored in fast access memory. The terms "slow access memory" and "fast access memory" are relative terms, where the relative speed of memory access may derive from using any one or more of (a) different memory technologies, (b) different memory access bus widths, (c) different proximity of the memories to the CPU (if memory and CPU are all implemented "on-chip"), and other technologies/architectures which provide for different memory access speeds. Memory technologies which can be used include Static random-access memory (SRAM) and Dynamic random-access memory (DRAM). SRAM is more expensive to produce, but is generally faster and requires less power than DRAM and, in modern computers, is often used as cache memory for the CPU. The active item is displayed and can be manipulated (ie viewed and/or edited) using an appropriate set of manipulation features which the MTM arrangement emulates. The user can move from the active item to a pseudo-active item (which then becomes the active item) simply by selecting an associated tab. This moves the user from one content item to another, quickly making available the content item and the associated manipulation features. The benefits of the MTM arrangements arise from the increased speed and simplicity, by using fast access storage for active and pseudo-active content items and avoiding the need to repetitively execute and exit associated software applications.

The MTM arrangement comprises a system and method for allowing a user of a mobile computing device to view and interact with content of different types and of any mix (documents, spread-sheet, presentations, web pages, local applications, forms, and any other document type), and in particular, to view and interact (ie manipulate) with content of various kinds on a single screen 'at the same time' (ie by switching rapidly and easily between content items). In one MTM arrangement, described hereinafter with reference to FIG. 4, multiple content items are presented using a set of tabs and associated display areas that allow the user to move between the content items by (a) selecting a desired tab, and thereby (b) making the content item associated with the selected tab active for manipulation (ie viewing or interacting). The term tab means a selectable graphical icon (comprising an image and/or text) which is associated with a particular content item that has been loaded into the MTM software application. Tabs may either be visible, as depicted in the example of FIG. 4, or accessible in other ways, such as via a pop-up menu activated by selection of a control pad 603 on a mobile device 600 (see FIG. 6).

In order to implement the MTM arrangements, the Applicant needed to overcome a number of difficulties associated with creating a software implemented structure that enables content to be viewed in each of a plurality of different sections (ie tabs) on a mobile device. These difficulties flow from the fact the in the mobile device environment, software code needs to run in a smaller memory environment, having slower processor CPU capabilities than are present in desktop machines. In particular, the MTM arrangements must be capable of passing the state of each tab to a storage system when the user moves between each tab. Furthermore, the arrangement must integrate a number of different software code structures for viewing and editing the information inside each tab. The disclosed MTM arrangements support this functionality, whilst ensuring that the system is responsive to the associated user commands.

Figure 6:
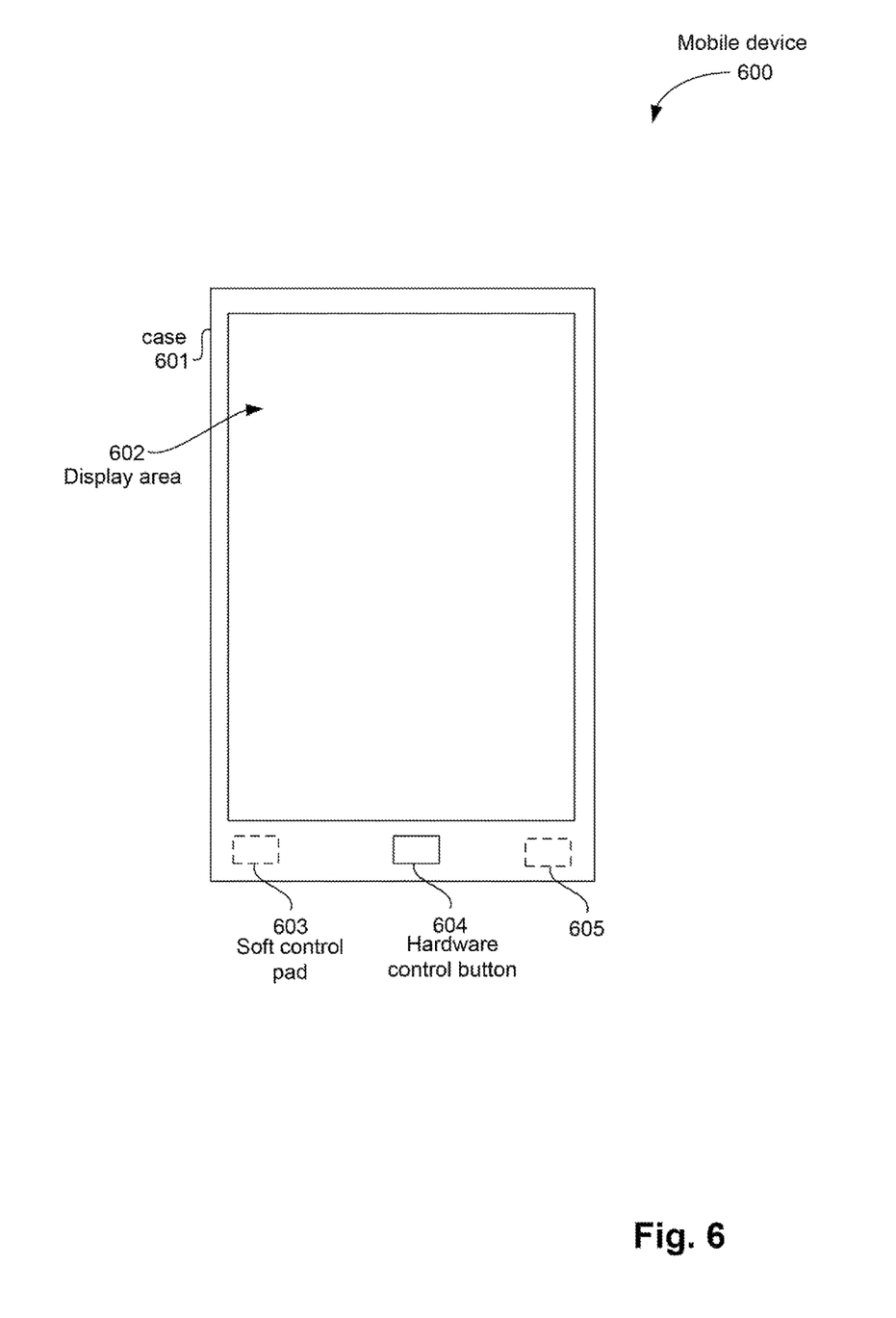
FIG. 6 depicts a typical mobile device (a smart phone in this example) upon which the MTM arrangements can be implemented.

FIG. 6 depicts the typical mobile device 600 (a smart phone in this example) upon which the MTM arrangements can be implemented. The smart phone 600 has a casing 601, a dual function touch sensitive display area 602 which acts both as a display (see 114 in FIG. 1A) and a touch sensitive user input device (see 113 in FIG. 1A). The smart phone 600 typically has a hardware control button 604 and one or more 'soft' touch-sensitive control pads 603, 605.

Figure 4:
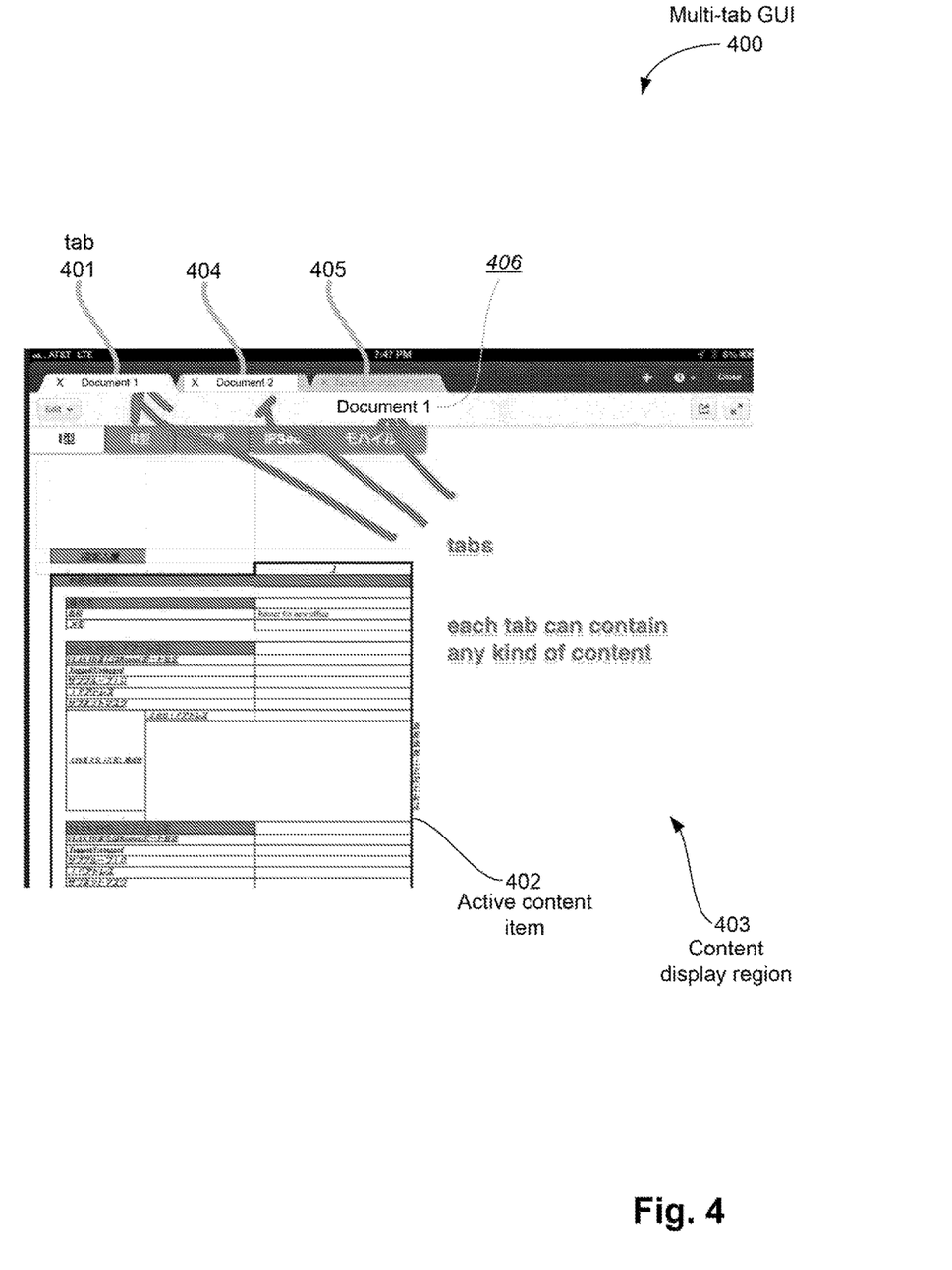
FIG. 4 shows an illustration of a multi-tab Graphical User Interface (GUI) according to an MTM arrangement.

FIG. 4 shows an illustration of a multi-tab GUI 400, that can be presented on the display 602 according, to an MTM arrangement example. In order to maximise the working area for the user, the GUI 400 typically covers most, or all, of the available display region 602. The GUI 400 depicts a first (current) tab 401 and an associated (current) content display region 403. An 'active' content item 402 entitled "Document 1" (as indicated by a header 406 at the top of the display region 403), is stored in a fast access memory 109 (see FIG. 1A) and presented in the current display region 403 without any other content items being displayed. The term 'active' denotes the fact that the content item 402 is ready to be manipulated using one or more manipulation operations that are available in an associated menu (not shown) of manipulation operations. The tab 401 is entitled "Document 1" which mirrors the header 406 referencing the content item 402 presented in the display region 403.

Although the tab 401 and other tabs referred to below are visible simultaneously in the example depicted in FIG. 4, other configurations of tabs can be used in MTM arrangements. Thus, for example, the tabs may not be visible all the time as depicted in FIG. 4, but may instead be accessed via a pop-up menu associated with one of the soft controls 603, 605.

A manipulation menu, which presents manipulation operations associated with the active item (ie associated with the software application used to create the active item) can, in one MTM arrangement, be visibly displayed as part of the GUI 400. Alternately, in order to maximise the working area for the user, the manipulation menu may be accessed as needed using the soft control pad 603 in which case the manipulation menu is presented in pop-up form when the control pad 603 is touched by the user.

Importantly, the manipulation features that are made available in the manipulation menu are defined according to the associated software application originally used to generate the active content item 402. Thus, for example, if the content item 402 is a word processing document, a bullet numbering feature, made available by the associated software application used to originally create the content item 402, is available in the manipulation menu. If however the content item is a spread-sheet document, then a column filter feature, made available by the associated software application used to originally create the content item 402, is available in the manipulation menu.

The GUI 400 also depicts a second tab 404 entitled "Document 2". The associated content display region in this case however is partially or completely hidden behind the content display region 403 and the pseudo-active content item entitled "Document 2" is not displayed and is not visible. The 'pseudo-active' content item (not shown) entitled "Document 2" has previously been loaded into the MTM software application by the user (described hereinafter in more detail with reference to steps 308 and 310 to FIG. 3) and is also stored in the fast access storage 109. The term 'pseudo-active' denotes the fact that the content item associated with the tab 404, while not immediately ready to be manipulated like the displayed content item 402, is nonetheless ready to be manipulated using one or more manipulation operations that are available in an associated menu (not shown) of manipulation operations as soon as the user selects the tab 404 and makes the content item active. In other words, the user can recall the content item associated with the tab 404 merely by selecting the tab 404, either by touching the tab 404 if the mobile device is the smart phone 600 with a touch sensitive display like 602, or by pressing a key on a 'normal' mobile phone running the MTM application, or by using another selection operation.

Figure 3:
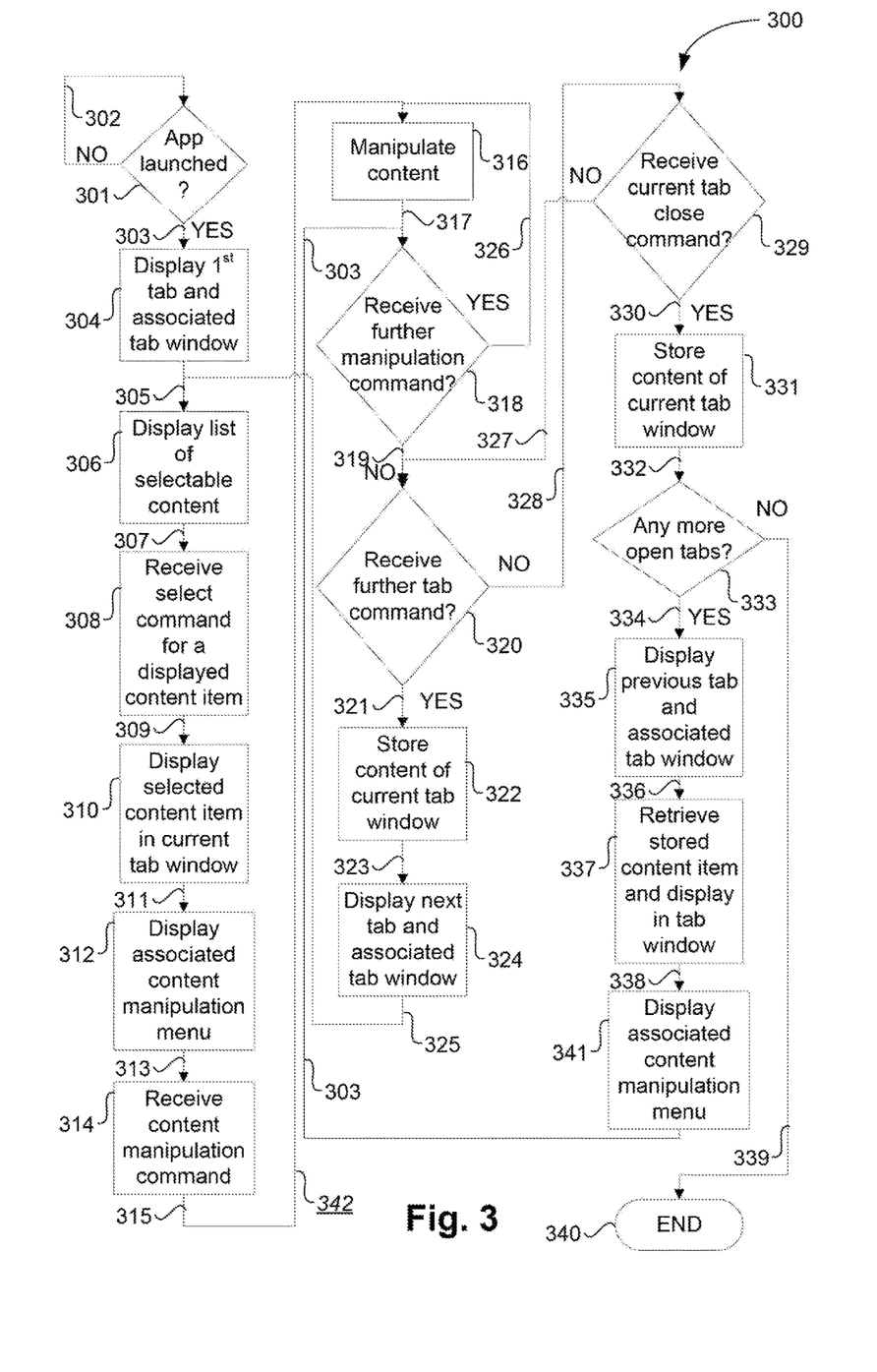
FIG. 3 shows a flow chart depicting one example of how the MTM arrangement can be implemented.

Content items which have not been loaded into the MTM software application (and thus into the GUI 400), described hereinafter in more detail with reference to FIG. 3, are referred to as being 'inactive', meaning that they need to be loaded into the GUI 400 under an associated tab in order to be quickly available to the user. Inactive content items can, in the MTM example shown in FIG. 4, be loaded into the MTM software application by selecting a 'new' tab 405. This operation results in presentation of a list of content items (described hereinafter in more detail with reference to FIG. 5.) Inactive content items are typically stored in slower access memory such as an SD card 125 (see FIG. 1A).

Figure 5:
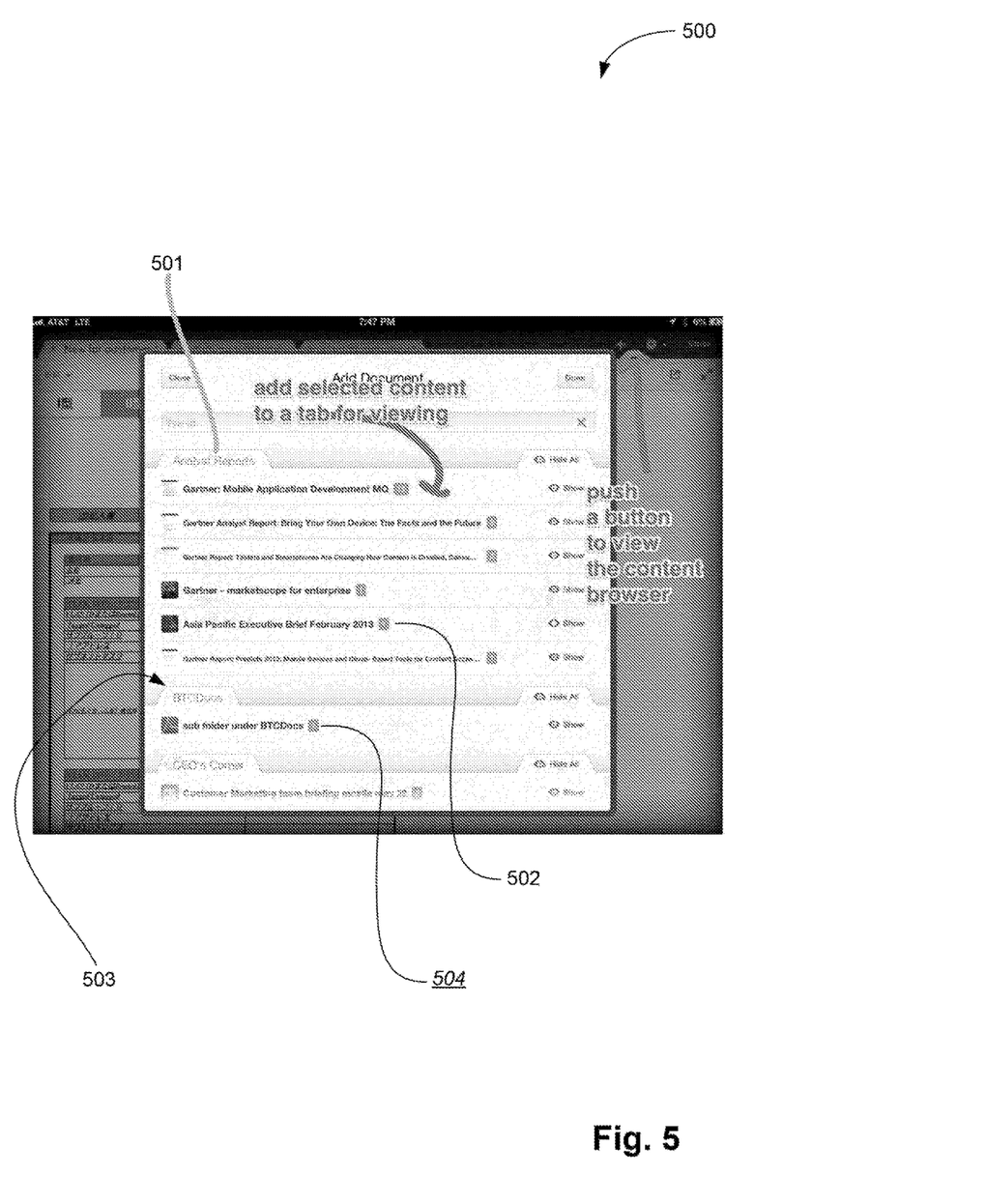
FIG. 5 shows an illustration of a list of content items that can be selected and manipulated using the MTM arrangement.

FIG. 5 depicts an illustration 500 of a list of content items including those that can be selected and manipulated using the MTM arrangement. In the example shown, FIG. 5 depicts a GUI that displays a list of content items stored on the mobile device in question. The GUI 500 shows a grouped list of content items. In a first group depicted by a tab 501, content items such as 502 are presented. In a second group depicted by a tab 503, content items such as 504 are presented. The tab 501 may refer to word processing documents, while the tab 503 may refer to JPEG images. Importantly, the tabs 501, 503 are not the same as the tabs 401, 402, and merely serve as indicators of the type of content item presented in the GUI 500. When the user selects (by double-clicking for example) a particular content item such as the content item 502, then the 'new' tab 405 previously selected in the GUI 400 will reflect the title of the selected content item 502, and the content item 502 becomes the active content item in the GUI 400.

Returning to FIG. 4, after the new content item 502 is added to the GUI 400, a new 'new' tab (ie a tab such as 405 which can be used to add a new content item) is created to the right of the tab now associated with the content item 502, enabling a further content item to be loaded into the MTM application and the GUI 400.

If an active or pseudo-active content item is no longer needed in a manipulation session, the user can delete the tab and the associated content item (described hereinafter in more detail with reference to FIG. 3).

Returning to FIG. 5, content items can be loaded into the MTM software application (and the GUI 400) one at a time as described. Alternately, a number of content items can be loaded into the MTM software application (and the GUI 400) simultaneously using any suitable multi-selection keystroke sequence available on the mobile device in question. A standard file system selector or a custom interface that combines content together for a single selection to add multiple content pieces can be used, so that the content items can be selected individually each to be added to a respective viewing tab, or content items can be selected all together with multiple content pieces added to a viewing tab structure in a single action, each content item being associated with a corresponding tab.

The MTM arrangement, which can be implemented as a single software application, can also be used advantageously to download to the mobile device, a number of content items, generated using different associated software applications. As part of the download process, the MTM arrangement loads the content items in one operation into the MTM software application and the GUI 400, ready for the user to manipulate.

Returning to FIG. 4, as noted, the manipulation features that are made available in the manipulation menu are defined according to the associated software application used to originally generate the active content item. Thus, for example, if the pseudo-active content item associated with the tab 404 is made active by selecting the tab 404, then the MTM software application 133 will associate the appropriate manipulation menu with the soft control pad 603 so that the user will be presented with the correct manipulation menu when the control 603 is pressed.

The MTM software application thus emulates manipulation features associated with the plurality of different associated software applications. The MTM arrangements are not used to create content items in the first instance however they can be used to manipulate content items previously created by the associated software applications to provide the user with the convenience and efficiency of the MTM arrangement without the user needing to execute the associated software applications at all.

Figure 1A:
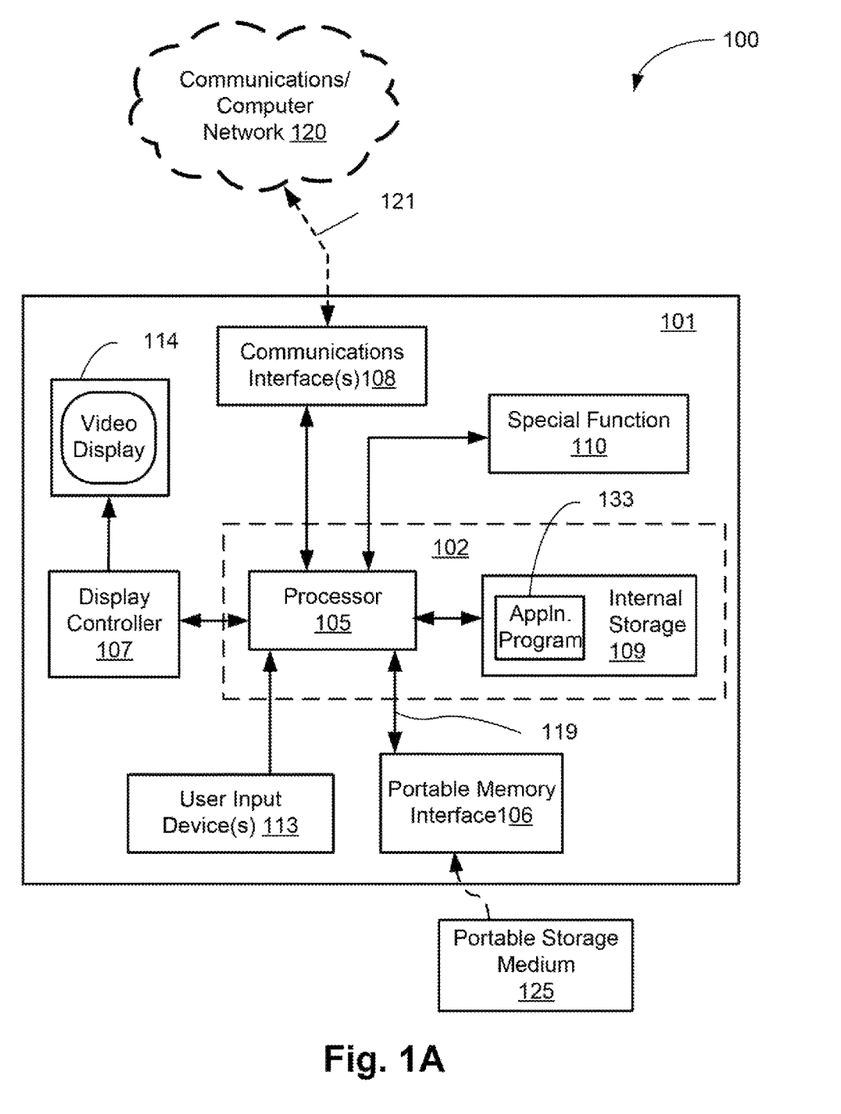
FIGS. 1A and 1B collectively form a schematic block diagram representation of an electronic device upon which described MTM arrangements can be practised.
Figure 1B:
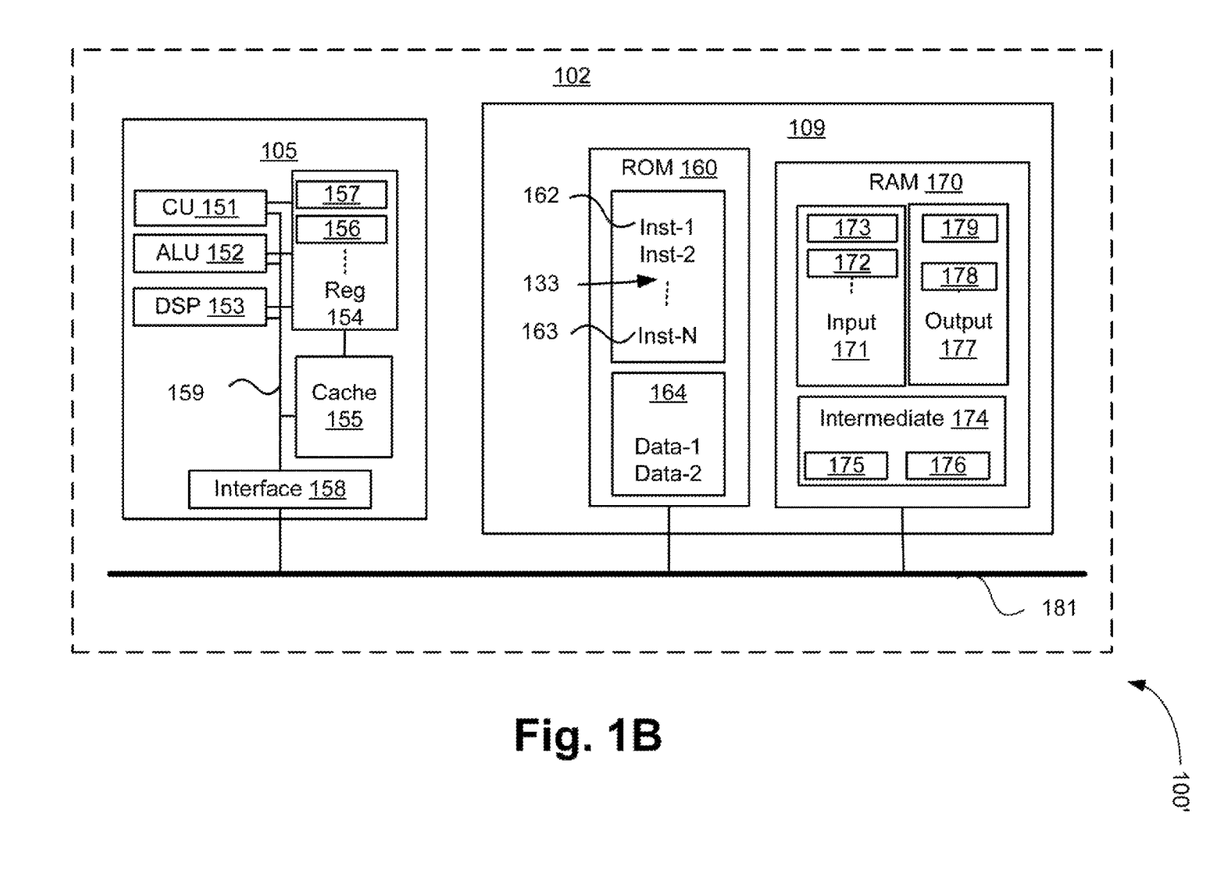

FIGS. 1A and 1B collectively form a schematic block diagram of a general purpose electronic device 101 including embedded components, upon which the MTM methods to be described are desirably practiced. In one MTM arrangement described hereinafter, the electronic device 101 represents the smartphone 600 having a touch sensitive display upon which a graphic user interface (ie GUI) is displayed. The user of the smartphone is presented with information by means of the touch sensitive display. The user of the smart phone can also input information including data and command inputs, for example, using the touch sensitive display.

In alternate MTM arrangements the electronic device 101 may be, for example, a portable media player or a digital camera, in which processing resources are limited. Nevertheless, the methods to be described may also be performed on higher-level devices such as desktop computers, server computers, and other such devices with significantly larger processing resources.

As seen in FIG. 1A, the electronic device 101 comprises an embedded controller 102. Accordingly, the electronic device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The electronic device 101 includes a display controller 107, which is connected to the video display 114, such as a liquid crystal display (LCD) panel or the like. The display controller 107 is configured for displaying graphical images on the video display 114 in accordance with instructions received from the embedded controller 102, to which the display controller 107 is connected.

The electronic device 101 also includes user input devices 113 which are typically formed by keys, a keypad or like controls. In the MTM arrangement described herein; the user input devices 113 include the touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used with MTM arrangements, such as, for example, a microphone (not illustrated) for voice commands or a joystick/thumb wheel (not illustrated) for ease of navigation about menus.

As seen in FIG. 1A, the electronic device 101 also comprises a portable memory interface 106, which is coupled to the processor 105 via a connection 119. The portable memory interface 106 allows a complementary portable memory device 125, to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks. Storage of inactive content items can be performed by using the relatively slow access SD card 125 typically available on the smartphone 600, and the content item can be moved to the faster dynamic RAM 109 when the content item becomes active or pseudo-active (eg is steps 310-316 in FIG. 3).

The electronic, device 101 also has a communications interface 108 to permit coupling of the device 101 to a computer or communications network 120 via a connection 121. In the MTM arrangements described herein, the connection 121 is typically radio frequency wireless. The wireless communication protocol can use the second generation (2G) GSM (Global System for Mobile Communications, originally Groupe Spécial Mobile) standard, the third generation (3G) based upon W-CDMA (Wideband Code Division Multiple Access) standard, or fourth generation (4G) technologies such as the WiMAX (Worldwide interoperability for Microwave Access) or LTE (Long-term evolution) standard.

In general however the connection 121 may be radio frequency or optical. An example of a wired connection includes Ethernet. Further, an example of wireless connection includes Bluetooth™ type local interconnection, WI-Fi (including protocols based on the standards of the IEEE 802.11 family), Infrared Data Association (IrDa) and the like.

Typically, the electronic device 101 is configured to perform some special function, such as the smartphone function described herein. The embedded controller 102, possibly in conjunction with further special function components 110, is provided to perform that special function. When the device 101 is a mobile telephone handset, as described herein, the components 110 represent those components required for communications in a cellular telephone environment. Where the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the process of FIG. 3 may be implemented as one or more software application programs 133 executable within the embedded controller 102. The electronic device 101 of FIG. 1A implements the described MTM methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The MTM software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs), such as those depicted in FIGS. 4 and 5, to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the MTM application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the electronic device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The MTM application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code.

Depending on the instruction just executed this may involve incrementing the address contained in the program counter or loading the program counter with a new address in order to achieve a branch operation.

Each step or sub-process in the processes of the described MTM methods is associated with one or more segments of the application program 133, and is performed by repeated execution of a fetch-execute cycle in the processor 105 or similar programmatic operation of other independent processor blocks in the electronic device 101.

FIG. 3 shows a flow chart depicting one process example 300 of how the MTM arrangement can be implemented. The depicted process 300 commences with a step 301 in which the processor 105 in the mobile device in question 100 determines if the MTM software application has been launched. If this is not the case, the process 300 follows a NO arrow 302 back to the step 301. If the application has been launched, the process 300 follows an arrow 303 to a step 304 in which the processor 105 displays a 1$^{st}$ tab (such as 401 in FIG. 4) and the associated content display region 403 which is empty in the present example. The process 300 then follows an arrow 305 to a step 306 in which the processor 105 displays, as depicted in FIG. 5, a list of content items which can be selected. Since the particular version of the MTM software application running on the mobile device 600 will support emulation with a particular set of associated software applications, not all content items in the list of content items can typically be processed by the MTM application.

The process 300 then follows an arrow 307 to a step 308 in which the processor 105 receives a select command from the user for a single content item in the list (such as 502 in FIG. 5 or example), or receives a select command for a number of content items in the list (such as 502 and 504 in FIG. 5 or example). The process 300 then follows an arrow 309 to a step 310 in which the processor 105 displays, if a single content item has been selected, the selected content item, which is now active, in the content display region 403. The tab 401 is updated to show the title of the content item, A 'new' tab is inserted at the right hand side of the tab associated with the new content item, to allow for further content items to be added. If multiple content items have been selected, in the step 310 the processor 105 displays the first selected content item in the content display region 403. The tab 401 is updated to show the title of the content item in question. The processor loads the other selected content items as pseudo-active content items, and generates their associated tabs, such as the tab 404, each showing the title of the associated content item. However, the pseudo active content items are stored, ready for activation by the user. A 'new' tab is inserted at the right hand side of the tab associated with the last one of the uploaded content items, to allow for further content items to be added.

The active content item and pseudo-active content items are stored in fast access memory such as the fast access memory 109 in FIG. 1A, to provide the user with the desired responsiveness when manipulating the content items. Inactive content items may be stored in slower memory such as the SD card 125, as such content items must be first loaded into the MTM software application and the GUI 400 before they can be manipulated using the MTM arrangement. This partitioning of different types of content items into different memory access speed requirement groups reduces the fast access memory load, and effectively creates a faster and more responsive platform.

The process 300 then follows an arrow 311 to a step 312 in which the processor 105 displays a content manipulation menu for the active content item. The process 300 then follows an arrow 313 to a step 314 in which the processor 105 receives a content manipulation command from the user, such as a command to select and copy a specified segment of text in the active content item. The process 300 then follows an arrow 315 to a step 316 in which the processor 105 performs the manipulation command and applies the relevant manipulation operation.

The process 300 then follows an arrow 317 to a step 318 in which the processor 105 determines if a further manipulation command has been received. If this is the case, the process follows a YES arrow 326 back to the step 316. If not, the process follows a NO arrow 319 to a step 320 in which the processor 105 determines if a further tab command has been received. This command can be either to delete a tab other than the current tab, or to add a new tab. If the command is to delete a tab other than the current tab, the processor 105 stores the associated content item, removes the associated tab and display region. If the command is to add a new tab, the process 300 then follows an arrow 321 to a step 322 in which the processor 105 removes the active content item from the display and stores the active content item from the current content display region. The process 300 then follows an arrow 323 to a step 324 in which the processor 105 displays the new tab, such as 405, and an empty content display region. The process 300 then follows an arrow 325 back to the step 306.

It is noted that manipulation of content in regard to one content item can be used in manipulation of content in regard to another content item. Thus if in the step 316 a section of text is copied from the then-active word processing document which is being manipulated, the copied text can be inserted by the step 316 when it is concerned with the subsequently-active spread-sheet document.

Returning to the step 320, if a further tab command is not received, the process 300 follows a NO arrow 328 to a step 329 in which the processor 105 determines if a command has been received to close the current tab. If this is not the case, the process 300 then follows a NO arrow 327 back to the step 320. If the command has been received, however, the process 300 then follows a YES arrow 330 to a step 331 in which the processor 105 stores the content of the current tab. The process 300 then follows an arrow 332 to a step 333 in which the processor 105 determines if there are any more open tabs. If this is not the case, then the process 300 determines that the manipulation session is over, and the process 300 follows a NO arrow 339 to an END step 340.

Returning to the step 333, if there are more open tabs, the process 300 then follows a YES arrow 334 to a step 335 in which the processor 105, having closed the then-current tab and display region, and having stored the then active content item, makes the 'previous' tab and the 'previous' display region current. The term 'previous' in this context typically indicates an adjacent tab and display region. Accordingly, if the current tab 401 and the current display region 403 are closed, and the then-active content item 402 is stored, then for example the previous tab 404 and it's associated content display region and content item can be made respectively current and active. The process 300 then follows an arrow 336 to a step 337 in which the processor 105 retrieves the previous stored content item, makes that content item active and displays the content item in the current display region under the current tab.

The process 300 then follows an arrow 338 to a step 341 in which the processor 105 displays a content manipulation menu which is associated with the active content item. The process 300 then follows an arrow 303 back to the step 318.

INDUSTRIAL APPLICABILITY

The arrangements described are applicable to the computer and data processing industries and particularly for the data processing industry associated with mobile devices.

The foregoing describes only some embodiments of the present invention, and modifications and/or changes can be made thereto without departing from the scope and spirit of the invention, the embodiments being illustrative and not restrictive.

The invention claimed is:

1. A computer implemented method of manipulating on a mobile device, using a single software application configured to emulate a set of pre-defined manipulation operations of a plurality of different associated software applications, content items generated by said plurality of different associated software applications and stored in slow access memory on the mobile device, the method comprising the steps of:

(a) moving a selected plurality of said items stored in the slow access memory to a fast access memory said items stored in the fast access memory being designated as pseudo-active items;

(b) designating one of the pseudo-active items as an active item and displaying the active item and an associated tab;

(c) displaying tabs associated with the pseudo-active items without displaying the pseudo-active items;

(d) displaying a list of the pre-defined manipulation operations, said list having been pre-defined according to the associated software application originally used to generate the displayed active item;

(e) applying a displayed pre-defined manipulation operation associated with the active item to the displayed active item to form a manipulated active item; and (f) in response to a selection of a displayed tab associated with a pseudo-active item, (i) storing the manipulated active item in the fast access memory and removing the manipulated active item from display, (ii) displaying the pseudo-active item associated with the selected tab, and (iii) designating the displayed item as the active item and the stored manipulated item as a pseudo-active item.

2. The method according to claim 1, comprising the further step of:

(g) applying pre-defined manipulation operation associated with the active item to the active item to form a manipulated active item, said pre-defined manipulation operation being dependent upon the operation applied in the step (e).

3. The method according to claim 1, wherein prior to the step (a) the method comprises the further steps of:

(h) displaying a list of the content items stored in the slow access memory; and (i) selecting a plurality of said items as pseudo-active items for storage in the fast access memory.

4. A mobile device configured for manipulating, using a single software application configured to emulate a set of pre-defined manipulation operations of a plurality of different associated software applications, content items generated by said plurality of different associated software applications and stored in slow access memory on the mobile device, the mobile device comprising:

a processor;
a fast access memory; and
a slow access memory storing a computer executable software program for directing the processor to execute a method comprising the steps of:

moving a selected plurality of said items stored in the slow access memory to a fast access memory said items stored in the fast access memory being designated as pseudo-active items;

designating one of the pseudo-active items as an active item and displaying the active item and an associated tab;

displaying tabs associated with the pseudo-active items without displaying the pseudo-active items;

displaying a list of the pre-defined manipulation operations, said list having been pre-defined according to the associated software application originally used to generate the displayed active item;

applying a displayed pre-defined manipulation operation associated with the active item to the displayed active item to form a manipulated active item; and in response to a selection of a displayed tab associated with a pseudo-active item, (i) storing the manipulated active item in the fast access memory and removing the manipulated active item from display, (ii) displaying the pseudo-active item associated with the selected tab, and (iii) designating the displayed item as the active item and the stored manipulated item as a pseudo-active item.

5. A non-transitory computer readable storage medium storing a computer executable software program configured to emulate a set of pre-defined manipulation operations of a plurality of different associated software applications, for directing a processor to execute a method, in a mobile device, for manipulating content items generated by said plurality of different associated software applications and stored in slow access memory on the mobile device, the program comprising:

computer executable code for moving a selected plurality of said items stored in the slow access memory to a fast access memory said items stored in the fast access memory being designated as pseudo-active items;

computer executable code for designating one of the pseudo-active items as an active item and displaying the active item and an associated tab;

computer executable code for displaying tabs associated with the pseudo-active items without displaying the pseudo-active items;

computer executable code for displaying a list of the pre-defined manipulation operations, said list having been pre-defined according to the associated software application originally used to generate the displayed active item;

computer executable code for applying a displayed pre-defined manipulation operation associated with the active item to the displayed active item to form a manipulated active item; and computer executable code for, in response to a selection of a displayed tab associated with a pseudo-active item, (i) storing the manipulated active item in the fast access memory and removing the manipulated active item from display, (ii) displaying the pseudo-active item associated with the selected tab, and (iii) designating the displayed item as the active item and the stored manipulated item as a pseudo-active item.

6. The computer implemented method of claim 1, wherein the steps of:

applying the displayed pre-defined manipulation operation; and responding to the selection of the displayed tab associated with the pseudo-active item;

are performed without opening and closing software applications associated with the active and pseudo-active items.

7. The computer implemented method of claim 1, further comprising:

switching between pseudo-active items and performing pre-defined manipulation operations on the pseudo-active items without opening and closing the associated software applications.

* * * * *